United States Patent
O'Brien et al.

(10) Patent No.: US 12,170,100 B1
(45) Date of Patent: Dec. 17, 2024

(54) SYSTEMS FOR AND METHODS FOR FAST MODE HOP DETECTION AND CORRECTION FOR HARD DISK DRIVE RECORDING SYSTEMS

(71) Applicant: Avago Technologies International Sales Pte. Limited, Singapore (SG)

(72) Inventors: Scott O'Brien, Eden Prairie, MN (US); Gregory W. Starr, Boulder, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/496,488

(22) Filed: Oct. 27, 2023

Related U.S. Application Data

(60) Provisional application No. 63/506,523, filed on Jun. 6, 2023.

(51) Int. Cl.
*G11B 5/012* (2006.01)
*G11B 5/00* (2006.01)

(52) U.S. Cl.
CPC ...... *G11B 5/012* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,999,511 | A * | 12/1999 | Jeon | G11B 7/005 369/47.25 |
| 6,144,627 | A * | 11/2000 | Muto | G11B 19/02 |
| 6,359,847 | B1 * | 3/2002 | Shimizu | G11B 7/005 369/53.26 |
| 6,538,832 | B1 * | 3/2003 | Ranmuthu | H03F 3/45959 |
| 6,631,044 | B1 * | 10/2003 | Choi | G11B 5/02 |
| 2002/0118479 | A1 * | 8/2002 | Yoshizawa | G11B 5/02 |

* cited by examiner

*Primary Examiner* — Peter Vincent Agustin
(74) *Attorney, Agent, or Firm* — Foley & Lardner LLP

(57) ABSTRACT

A solution can detect an HDD laser mode hop within an improved response time using a sensor amplification circuitry balanced by a frequency response of a gain stage circuit. A sensor of a first circuit can receive an optical signal of a laser as input and output a first voltage that an amplifier can amplify to produce an amplified first voltage indicative of a mode hop event trailing the optical signal by a first response time of a first frequency response. A second circuit coupled in series with the first circuit and operating according to a second frequency response an inverse of the first frequency response can receive the amplified first voltage and generate, based at least on the amplified first voltage adjusted by the second frequency response, a second voltage indicative of the mode hop event within a second response time that is shorter than the first response time.

20 Claims, 5 Drawing Sheets

SYSTEMS FOR AND METHODS FOR FAST MODE HOP DETECTION AND CORRECTION FOR HARD DISK DRIVE RECORDING SYSTEMS

CROSS-REFERENCE TO RELATED PATENT APPLICATIONS

This application claims the benefit of priority from U.S. Provisional Patent Application No. 63/506,523, filed Jun. 6, 2023, which is incorporated herein by reference in its entirety and for all purposes.

TECHNICAL FIELD

This disclosure generally relates to systems and methods for control and operation of hard disk drives (HDDs), including, but not limited to, laser mode hop detection in HDDs.

BACKGROUND

Hard disk drives (HDDs) can be used for storing data in computers and other electronic devices. HDDs can include a variety of designs and components, such as magnetically sensitive platters on which data can be written or read and actuator arms for reading or writing data.

SUMMARY

When utilizing a laser to provide heat assisted magnetic recording (HAMR) in Hard Disc Drives (HDDs), sensors (e.g., bolometers or photodetectors) can be used to monitor the spot size of the optical output from the laser and facilitate a consistent and stable spot size output. However, lasers can occasionally experience mode hop events in which the lasing mode of the optical output or its wavelength can unexpectedly change, affecting the spot size and making the spot size inconsistent and unstable. Meanwhile, the sensors used to monitor the optical output and the spot size can have a bandwidth and time response that falls short of the desired system response time, making it difficult to timely detect mode hop events in real time. Aspects of the technical solutions presented herein overcome these challenges by providing a mode hop detection and correction circuitry having a gain stage circuit whose frequency response matches an inverse of the frequency response of the amplified sensor circuit, allowing for a faster detection of the mode hop events and allowing for timely laser drive feedback or corrections.

An aspect is directed to a circuitry. The circuitry can include a sensor of a first circuit configured to receive as input an optical signal of a laser of a storage device and output a first voltage or current indicative of the optical signal. The circuitry can include an amplifier of the first circuit configured to amplify the first voltage or current to produce an amplified first voltage indicative of a mode hop event. The amplified first voltage can trail the optical signal by a first response time of a first frequency response of the first circuit. The circuitry can include a second circuit coupled in series with the first circuit and configured to receive the amplified first voltage. The second circuit can operate according to a second frequency response that is an inverse of the first frequency response. The circuitry can be configured to generate, based at least one the amplified first voltage adjusted by the second frequency response, a second voltage indicative of the mode hop event. The second voltage can be generated within a second response time that is shorter than the first response time.

The first frequency response can be defined by at least an intrinsic resistance and an intrinsic capacitance of the sensor. The sensor can be at least one of a bolometer or a photodetector. The second response time can be, or correspond to, a time duration of between 1ns and 5 us.

The second frequency response can be defined by at least a resistance of a resistor of the second circuit and an inductance of an inductor of the second circuit. The resistor and the inductor can be coupled in a series arrangement. The second frequency response can be defined by at least a resistance of a resistor of the second circuit and a capacitance of a capacitor of the second circuit. The resistor and the capacitor can be coupled in a series or a parallel arrangement.

The optical output can be indicative of the mode hop event at a time of occurrence of the mode hop event. The amplified first voltage can be indicative of the mode hop event within the first response time from the time of occurrence, and the second voltage is indicative of the mode hop event within the second response time from the time of occurrence. The second response time can correspond to a time duration with respect to the time of occurrence of the mode hop event that is typically ten times shorter than a time duration of the first response time with respect to the time of occurrence of the mode hop event.

The first response function can correspond to an output of the first circuit decreasing in decibels at a first rate as a frequency increases. The second response function can correspond to an output of the second circuit increasing in decibels at the first rate as the frequency increases. The second voltage can remain at zero decibels as the frequency increases. The second voltage can be input into a driver circuit for the laser to adjust the optical signal of the laser. The second voltage can be input into a peak detector to determine that a mode hop event has occurred responsive to an increase in the second voltage.

An aspect is directed to a method. The method can include receiving, by a sensor of a first circuit, as input an optical signal of a laser of a storage device and output a first voltage indicative of the optical signal. The method can include amplifying, by an amplifier of the first circuit, the first voltage to produce an amplified first voltage. The amplified first voltage can trail the optical signal by a first response time of a first frequency response of the first circuit. The method can include a second circuit coupled in series with the first circuit operating according to a second frequency response that is an inverse of the first frequency response. The method can include the second circuit receiving the amplified first voltage. The method can include generating by the first circuit and the second circuit, based at least on the amplified first voltage adjusted by the second frequency response, a second voltage indicative of the optical signal. The second voltage can be generated within a second response time that is shorter than the first response time.

The first frequency response can be electrically modeled by at least an intrinsic resistance and an intrinsic capacitance of the sensor. The sensor can be at least one of a bolometer or a photodetector and the second response time corresponds to a time duration of between 1ns and 5 us. The second frequency response can be defined by at least a resistance of a resistor of the second circuit and an inductance of an inductor of the second circuit. The resistor and the inductor can be coupled in a series arrangement. The second frequency response can be defined by at least a resistance of a resistor of the second circuit and a capacitance of a capacitor of the second circuit. The resistor and the capacitor can be coupled in a series arrangement.

The method can include the optical output indicating the mode hop event at a time of occurrence of the mode hop event. The method can include the amplified first voltage indicating the mode hop event within the first response time from the time of occurrence. The method can include the second voltage indicating the mode hop event within the second response time from the time of occurrence. The second response time can correspond to a time duration with respect to the time of occurrence of the mode hop event that is at least ten times shorter than a time duration of the first response time with respect to the time of occurrence of the mode hop event.

The first response function corresponds to an output of the first circuit decreasing in decibels at a first rate as a frequency increases, wherein the second response function corresponds to an output of the second circuit increasing in decibels at the first rate as the frequency increases, and wherein the second voltage remains at zero decibels as the frequency increases.

The method can include the second voltage input into a driver circuit for the laser adjusting the optical signal of the laser. The method can include determining, by the second voltage input into a peak detector, that a mode hop event has occurred responsive to an increase in the second voltage.

An aspect is directed to a hard disk drive system. The hard drive system can include a sensor of a first circuit configured to receive as input an optical signal of a laser of a storage device and output a first voltage indicative of the optical signal. The hard drive system can include an amplifier of the first circuit configured to amplify the first voltage to produce an amplified first voltage indicative of a mode hop event. The amplified first voltage can trail the optical signal by a first response time of a first frequency response of the first circuit. The hard drive system can include a second circuit coupled in series with the first circuit and configured to receive the amplified first voltage. The second circuit can operate according to a second frequency response that is an inverse of the first frequency response. The first circuit and the second circuit can be configured to generate, based at least on the amplified first voltage adjusted by the second frequency response, a second voltage indicative of the mode hop event, the second voltage generated within a second response time that is shorter than the first response time.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Figure 1:
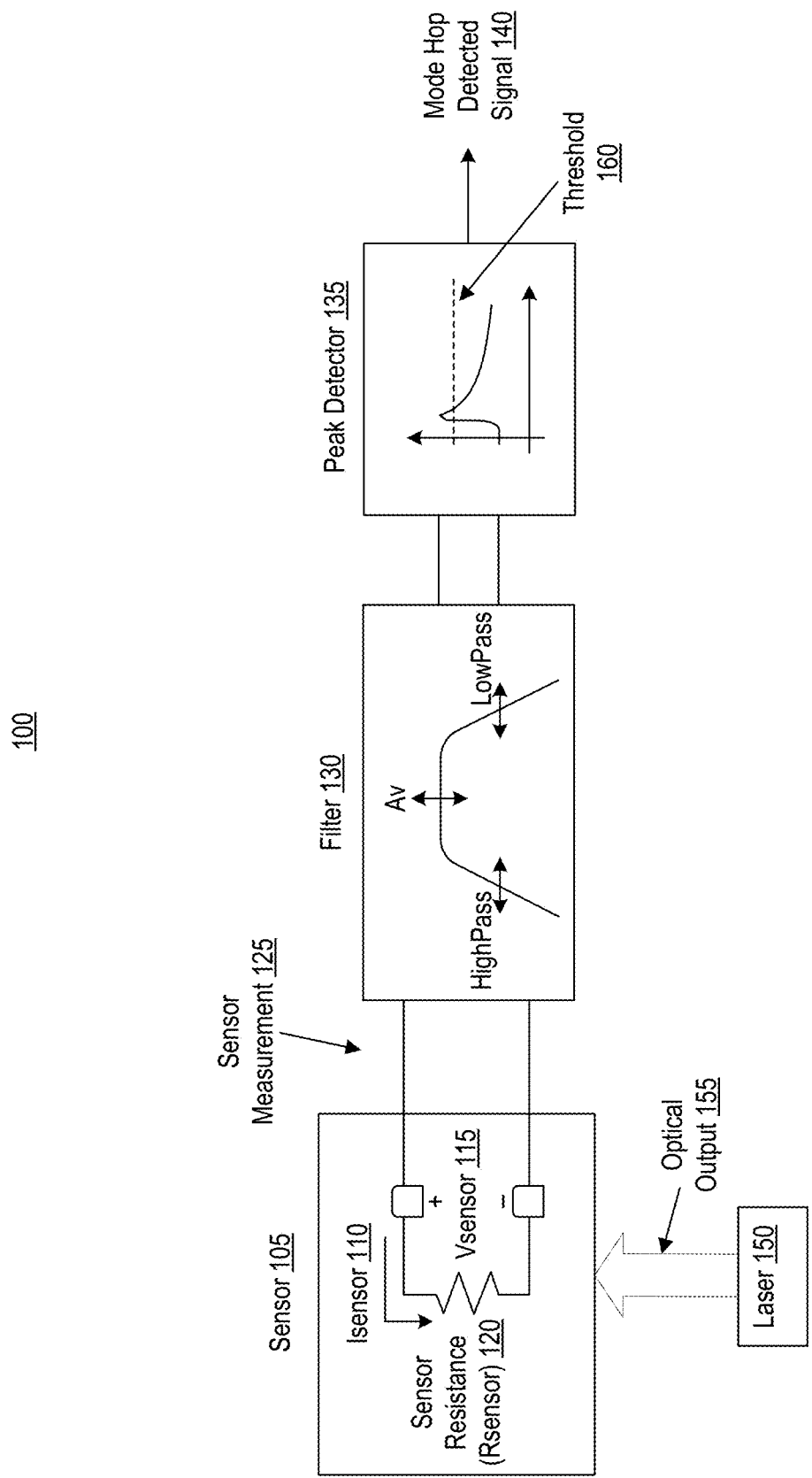
FIG. 1 is an example block diagram of a system for detecting a mode hop event of a laser (e.g., laser diode) in a hard disk drive (HDD) using a sensor.

The present embodiments shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in software should not be limited to such implementation alone, but they can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

In Hard Disc Drives (HDDs), an energy assisted method, known as heat assisted magnetic recording (HAMR), can include using a laser to increase a local temperature of a portion of the disk to allow recording of the data onto an HDD at an improved bit density. The localized portion of the disk on which the laser provides this heat from its optical output can be referred to as the "spot size". Precise control of the spot size can be important to achieve areal density targets as it can define both the bit and track widths. However, accurately controlling the spot size can be difficult to accomplish as the laser can occasionally experience a mode hop. A mode hop, also referred to as a mode hop event, can include a sudden and unexpected shift in the operating mode or characteristics of an optical output of a laser, such as an unexpected change in the frequency or power of the optical output of a laser. Mode hops can be caused by variations in a laser cavity length, which can be caused by temperature shifts, mechanical vibrations or changes in laser's internal or external environment, which can, as a result, disrupt the resonance conditions for a specific mode of a laser. Such mode hops can adversely affect HDD operation and HDDs can therefore include sensor for monitoring optical output of the lasers, detect the mode hops, and take any corrective action.

Sensors used in HAMR systems of the HDDs can include any transducer sensor (e.g., photo diode or a bolometer) that can be configured to monitor power or intensity of the optical output of the laser during the HDD operation. A bolometer can include any thermal sensor that measures changes in temperature by detecting variations in electrical resistance. A photodetector can include any sensor or semiconductor device that converts incoming light or photons into electrical current or voltage. A preamplifier circuit can be used to amplify the sensor output (e.g., measurement) signal up to the operational power levels and then facilitate measuring of the optical output power that can sometimes vary over time. However, the sensors used in HAMR systems of HDDs (e.g., bolometers or photo diodes) can be limited in terms of electrical bandwidth and thus be unable to provide or support real time power monitoring of the laser output at acceptable rates.

For instance, a sensor, such as a bolometer or a photo diode, can have a bandwidth of approximately between 100 kHz to 1 MHz whereas data rates of more than 4 Gb/s can be desired or used by the HDD system. This discrepancy between the sensor bandwidth and the operating data rate can create challenges due to the sensor taking over 1 us to indicate a change in the optical power (e.g., a mode hop event), as this time duration can cover a significant portion of a write mode action (e.g., one or more write sectors) of the system.

Also concerning is that when a mode hop occurs near the end of the recording event (e.g., within 1 us of the end of the recording event), unrecoverable data may be imprinted onto the disk that may not be detected in time and can lead to a data corruption. Since at the end of the write operation the laser can be turned off or have its power reduced to avoid erasing previously recorded data, it may be challenging for the system to wait for the monitoring sensor to catch up to the signal that the laser is outputting. The technical solutions of the present disclosure allow for real time detection and correction of any optical output of the laser, including mode hops, over a broad range of bandwidth of the power monitoring sensor. For example, the present solution can allow for real time detection and correction of laser power error even when the sensor's electrical bandwidth lags behand the operating data rates.

A frequency response of a circuit, device or a system can include any characteristic behavior of the circuit, device or the system in response to varying input frequencies. A frequency response can be represented as a plot of amplitude (or gain) versus frequency, and can describe how such a specific circuit, device or system transmits, attenuates, or amplifies signals at different frequencies within a given frequency range. For example, a sensor used to monitor laser output and detect mode hop events can have its own frequency response, and other parts of the circuitry or the system can have their own. The technical solutions of the present disclosure provide a circuitry (e.g., a data path) having a frequency response that balances or compensates for the frequency response of the sensor to yield an overall full data path response that is flat (e.g., does not attenuate as a function of increased frequency) out to a frequency range of up to about the data rates (e.g., more than 1 GHz). The output of the circuit (e.g., data path) of the technical solutions can be used to drive a peak detection circuit to report a digital fault or event (e.g., a mode hop event) to a user or a system or be used as an input into a laser driver circuitry to correct the optical output in real time.

FIG. 1 illustrates an example of a block diagram of a mode hop detection circuitry or a system 100. Mode hop detection system 100 can include a circuit or a circuitry that can include and utilize a transducer sensor 105 measuring an optical output 155 from a laser 150 and providing a sensor measurement 125 to a filter 130. Filter 130 can filter the received sensor measurement 125 and provide its output to a peak detector that can utilize a threshold 160 to provide a mode hop detected signal 140.

Laser 150 can include any laser or a laser diode emitting focused optical output 155 (e.g., light) onto the surface of the HDD's magnetic recording media, creating localized heated regions. As the heat reduces coercivity of the media, HDD can more easily write data to the disk, allowing for higher recording densities and improved storage capacity in HDDs. Laser 150 can operate at a power range of between one or more milliwatts to one or more watts. Optical output 155 can include any optical output range of between 400 nm to 10 um, including for example 800-1000 nm range.

Sensor 105 can include any combination of hardware and software for detecting an optical signal or output. Sensor 105 can include any photodetector, photo diode, bolometer or any other device producing output (e.g., voltage or current) in response to a light exposure or input. Sensor 105 can be placed or located in proximity of the laser 150 or its optical output 155 and used to monitor at least a portion (e.g., a fraction) of the optical output 155. Sensor 105 can be placed across from a laser, or towards a surface from which laser light is reflected, in order to detect, monitor or measure optical output 155 from a laser 150.

Sensor 105 can include and be characterized by an electrical resistance RSensor 120 that can be inherent in the sensor 105. Because the sensor 105 can be driven with a DC bias current ISensor 110, a voltage VSensor 115 (e.g., voltage across the sensor 105) can be detected, measured and monitored. VSensor 115, also referred to as the voltage of the sensor 105, can increase and decrease in response to increased or decreased optical output 155 from the laser 150. As a result, VSensor 115 can include a voltage that is indicative of the optical signal 155 of the laser 150.

Monitoring the ISensor 110 and/or VSensor 115 can allow the present technical solutions to react when the sensor 105 (e.g., the bolometer or photodetector) is exposed to optical output 155 (e.g., changes in optical output due to changes in laser power input). For example, power perturbation can cause a perturbation in the RSensor 120 and can affect the VSensor voltage, causing the change in the sensor measurement 125.

Sensor measurement 125, depending on the arrangement can be, or correspond to, a VSensor 115 voltage and can reflect any change in optical output 155 signal. VSensor 115 can be input into or passed through filter 130. In some examples, depending on the type of sensor 105, ISensor 110 current can be input into the filter 130 as the sensor measurement 125. Filter 130 receiving the sensor measurement 125 can include a bandpass filter and can include a gain circuitry with a programmable gain for amplifying or strengthening the sensor measurement 125. Filter 130 can have corner frequencies (e.g., frequency poles) to remove DC signals or contents, which can be large, as well as remove any high frequency signals or noise.

The output of the filter 130 (e.g., bandpass filter) can be fed into or passed to a peak detection circuit or peak detector 135. Peak detector 135 can include and utilize a programmable threshold 160 to detect if the filtered sensor measurement includes a peak, indicating the occurrence of a mode hop event. The programmable threshold 160 can include or be coupled with a circuit that can send a digital output to fault monitoring control circuitry.

Peak detector 135 can detect mode hop events that can exceed a programmable threshold in either polarity (positive or negative edges). When the filtered signal exceeds the threshold 160, the peak detector 135 can provide or output a mode hop detected signal 140, indicative that the mode hop event has been detected. This can, in turn, allow the HDD system to utilize the circuitry or functionality for correcting any corrupted data or take corrective action with the laser 150.

Figure 2:
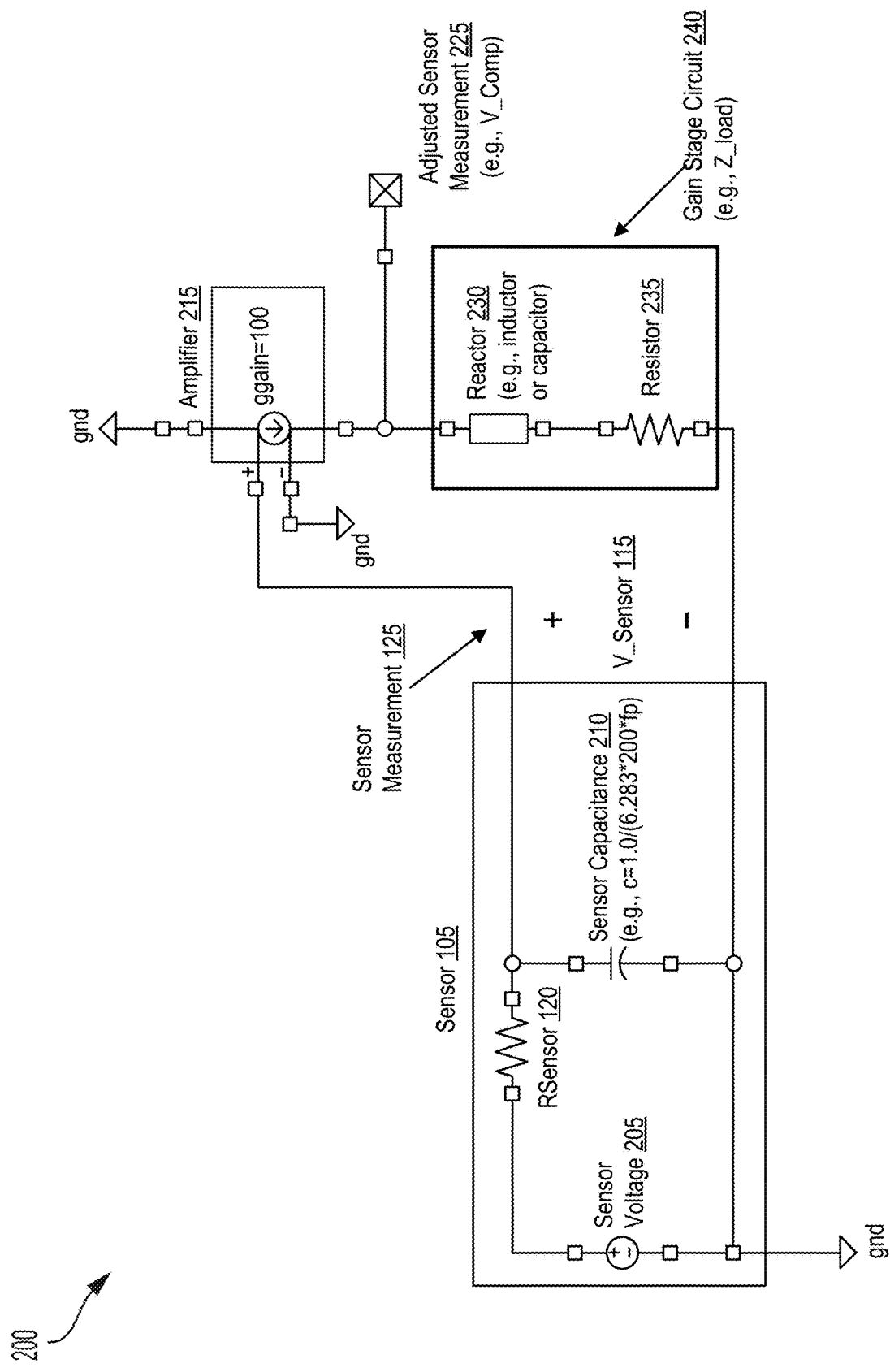
FIG. 2 is an example block diagram of a system for detecting an HDD laser mode hop within an improved response time using a sensor amplification circuitry balanced by a frequency response of a gain stage circuit.

FIG. 2 illustrates a circuit diagram of a system or circuitry 200 providing an improved mode hop detection and correction within a shortened response time, such as the response times at up to the data rates of the HDD. The system or circuitry 200 can include a sensor 105 that detects or receives at least a portion of an optical output 155 of a laser 150. For instance, sensor 105 can include a sensor voltage 205, a resistance sensor (RSensor) 120, and a sensor capacitance 210. Sensor 125 can provide a sensor measurement 125 that can be input into an amplifier 215 to amplify the sensor measurement 125 by any gain value (e.g., gain of 10, 20, 30, 50, 100 or 200). Coupled in series with the sensor and the amplifier 215 can be a gain stage circuit 240 having a reactor 230 (e.g., capacitor or an inductor) which can be coupled (e.g., in any combination of parallel or series arrangement) with a resistor 235. The gain stage circuit 240 can have a frequency response that matches an inverse of the frequency response of the amplifier 215 and the sensor 105, thereby providing a flat frequency response across the entire operational frequency range of the sensor 105 (e.g., a response that does not increase or decrease the decibels of the output as a function of frequency), thereby allowing an improved response time of the mode hop event detection circuitry or system 200.

It is understood that that other circuit designs for implementing the high frequency gain peaking that can be employed with the present technical solution. For example, the design could be implemented with metal-oxide-semiconductor field-effect transistors (MOSFETs). For example, the solution can include a circuitry using a MOSFET differential pair with a MOSFET load in a common-gate configuration in which the gate terminals of the load transistors are connected to an AC ground via a resistive element. The MOSFET differential pair can include reactance and resistance that in combination can generate a frequency response of the gain stage. The resistive elements can include resistors or other transistors or semiconductor features providing a certain resistance. Although the illustrated examples focus on Mode Hop events, it is understood that the present technical solutions can be utilized for any laser power change applications or events.

Optical output 155, also referred to as optical signal 155, can any emitted light or electromagnetic radiation produced by laser 150. Optical output or signal 155 can be characterized by specific properties of the particular laser 155, such as a particular wavelength, intensity, or coherence. Optical output or signal 155 can be at least partly detected by the sensor 105 and can include, reflect, signify, reveal, show or indicate various optical features, such as a mode hop event a transition from a read mode of operation of the HDD to a write mode of operation of the HDD, or any other event affecting the optical output 155. For instance, sensor 105 can include or receive an optical output 155 that changes or increases in its intensity within up to about 10 ps, 50 ps, 100 ps, 200 ps, 500 ps, 1 ns, 2 ns or longer. Sensor voltage 205 can correspond to the voltage of the detected portion of the optical input at the sensor 105 at a rate defined by the bandwidth of the sensor 105, which can correspond to the frequency response of the sensor 105. Sensor voltage 205 can reflect input of the optical signal into the sensor 105.

Sensor 105 can include an inherent or intrinsic resistance (RSensor) 120, which can have any resistance value, such as, for example 100 ohms, 200, or 500 ohms. Sensor 105 can have an inherent or intrinsic reactance of the sensor 105, such as a sensor capacitance 210 (e.g., or inductance of the sensor). In some examples, the reactance of the sensor 105 can be represented as inherent inductance of the sensor 105. Sensor's inherent or intrinsic reactance (e.g., capacitance 210) can be represented as a capacitor connected in series to the RSensor 120 and having a capacitance value corresponding to a cutoff frequency of the RC circuit. The inherent or intrinsic reactance and/or resistance of the sensor 105 can correspond to the sensor 105 or it can include its surrounding circuitry (e.g., amplifier 215) and can establish, define or produce a frequency response of the sensor 105 and/or its surrounding circuitry. As sensor 105 can have a frequency response that limits the responsiveness of the sensor at higher frequencies (e.g., around 1 MHz or above/below), the sensor 105 can have an inherent delay in its response to the frequency signal and therefore trail the optical output 155 of the laser 150.

Sensor capacitance 210 can be used to represent the reactance of the sensor 105 and can have a value of $C=1/(2*pi\ value*frequency\ cutoff*RSensor)$ (e.g., 200 ohms)). The pi value can correspond to 3.14159. While the illustrated example provides a sensor 105 with an inherent resistance and reactance (e.g., providing, setting, affecting or defining the frequency response of the sensor 105), it is understood that any combination of capacitors, inductors and resistors can be used to model, define or represent the inherent resistance and reactance of the sensor 105.

An amplifier 215 can include any circuit or component providing a gain for an input signal. The gain of the amplifier can be greater than 1, such as about a factor of 5, 10, 15, 20, 50, 100, 200 or more than 200 of the value of the input signal. Amplifier 215 can receive a sensor measurement 125 and apply a gain that increases the voltage of the signal. Amplifier 215 can include any signal amplification circuit, such as an operational amplifier, a transistor-based amplification circuit or any other circuit amplifying voltage of a signal. For example, amplifier 215 can amplify the sensor measurement 125 by a factor of 100. Amplifier 215 can be coupled between the sensor measurement 125 (e.g., V_sensor node) and the ground.

As amplifier 215 can amplify or increase the gain of the output of the sensor 105 (e.g., VSensor 115 or sensor measurement 125) and the sensor 105 output can trail the optical output 155 of the laser 155, the amplified output from the amplifier 215 can trail the optical output 155 by a time interval. Trailing of a signal can include any response to a signal or a decay to the signal that can extend beyond the intended or desired time frame, resulting in the signal response being delayed. Trailing of a signal can be caused by effects of capacitance, inductance, or filtering in a circuitry, device or a system, which can correspond to, or be characterized by, the frequency response of the circuitry, device or the system. For instance, when sensor 105 has a frequency response that defines the response time of the sensor 105 to be limited to about 1 MHz, then the sensor 105 output can trail the optical output 155 by about 1 us. As such, an amplifier 215 amplifying the sensor 105 output (e.g., sensor measurement 125) that trails the optical output 155 by about 1 us, can trail the same optical output 155 of the laser 150 by 1 us as well as any other delay that may be introduced by the amplifier 215 and any other intervening circuitry.

Amplifier 215 can be coupled or provide an adjusted sensor measurement 225 (e.g., V_Comp node). Adjusted sensor measurement 225 can correspond to an output of the system or circuitry 200 and can detect the mode hop events, or any other events, within a response time that is shorter than the response time of the sensor 105 alone. Adjusted sensor measurement 225 can provide output within a time period of, for example, 1 ns, 10 ns or 50 ns from the time of the mode hop event reflected in the optical output, whereas the sensor measurement 125 alone can detect the same mode hop event within 1 us. For example, adjusted sensor measurement 225 (e.g., V_comp) can provide a mode hop detection within a response time that is about 10, 100 or 1000 time shorter than the response time of the transducer sensor 105 having a bandwidth of approximately 1 MHz and response time of about 1 us.

Coupled beneath the adjusted sensor measurement 225 (e.g., between the adjusted sensor measurement 225 node and the ground) is a gain stage circuit 240. Gain stage circuit 240 (e.g., Z_load) can include any circuitry providing a complementary (e.g., a matching or an inverse) frequency response, which when combined with the frequency response of the first circuit (e.g., sensor 105 and/or sensor 105 and the amplifier 215) provides an output that remains flat over a range of frequencies. Gain stage circuit 240 (e.g., Z_load), also referred to as the second circuit, can include any combination of resistors, capacitors or inductors which can be combined in any configuration of parallel or series arrangement to provide a frequency response that corresponds to the frequency response of the first circuit (e.g., any combination of one or more of a sensor 105, amplifier 215 or any other associated filters or circuits). For example, gain stage circuit 240 can include any combination of resistors, capacitors and/or inductors arranged in any combination of a series and/or a parallel arrangement to provide a frequency response of the gain stage circuit 240 that matches an inverse of the frequency response of the sensor 105 and the amplifier 215.

Amplifier 215 and the sensor 115 can be referred to as a first circuit. The first circuit can also include any filters (e.g., low pass, high pass or band pass filters) for filtering or adjusting the sensor measurement 125 signal. The first circuit can have a first frequency response which can be balanced, counterbalanced, offset, adjusted or combined with the second frequency response of the second circuit (e.g., gain circuit 240).

For example, gain stage circuit 240 can include an inductor and a resistor in a series connection. For example, inductor can have any value between 0.05 nH (e.g., nanohenries or nH) and 10 n, such as up to 1 n, 1.2 n, 1.45 n, 1.53 n, 1.59 n, 1.65 n, 1.78 n, 2.0 n, 2.55 n, 3 n, 5 n, 7 n or 10 n. Inductor can have any value between 0.01 nH and 1H, based on the application. The resistor can have any resistance value between 1000 megaohms and 10 ohms, such as up to 100 ohms, 1000 ohms, 1 megaohms, 5 megaohms 10 megaohms, 50 megaohms or 1000 megaohms, based on the application. For example, Z_load can include a series of resistors and an inductor to set, establish, specify, adjust, improve or otherwise control the response time of the system or circuitry 200. Gain stage circuit 240 (e.g., Z_load) can include or correspond to a gain stage with a frequency response to compensate for the sensor bandwidth that is lower than the bandwidth corresponding to the data rate.

Since a mode hop detection system 100 can include a transducer sensor 105 characterized by an electrical resistance, the transducer sensor can produce a voltage (V_sensor 115) that can be received and monitored (e.g., across the sensor). V_sensor 115 can be, or correspond to, the sensor measurement 125. When the sensor signal responds to the change in optical output 155 of the laser 150, the sensor signal can be used to detect mode hop events. For instance, the sensor output can be passed through a bandpass filter to remove the DC content and the high frequency noise. The filtered sensor signal can be fed into a peak detector 135 that can detect mode hop events based on the input filtered signal exceeding a threshold 160 value.

Gain stage circuit 240 can improve the frequency response time of the sensor 105 based on the values and the arrangement of the resistors 235 and reactors 230 (e.g., inductors or capacitors) of the gain stage circuit 240. For example, a gain stage circuit 240 can include a reactor 230 that is inductor coupled in series with a resistor 235. Such a gain stage circuit can be referred to as an inductive peaking circuit or an LC filter. For example, gain stage circuit 240 can be designed or configured (e.g., via specific values for the reactor 230 and/or resistor 235) to boost the high-frequency response of a system 200 (e.g., compensating for the deficient bandwidth of the sensor 105), while maintaining a relatively flat response at lower frequencies. For example, an inductor component of the reactor 230 for the LC filter can provide an inductive reactance that can increase the frequency response of the entire system or circuitry 200 (e.g., over a frequency range corresponding to operating range of the HDD). Such an adjustment in the frequency response can allow higher-frequency signals to pass through the data path of the system 200 more easily, improving the frequency response of the overall system 200 and compensating for the sensor 105 being bandwidth limited with respect to the data rate.

Reactor 230, also referred to as a reactance component, can include any inductor or a capacitor component or any component providing reactance (e.g., inductance or capacitance). For instance, reactor 230 that is an inductor can be arranged in a series arrangement with the resistor 235. While example reactor 230 is illustrated in an inductor based configuration, it is understood that in a variation of design a capacitor can be used in accordance with modifications to the circuitry to accomplish the inverse transfer function of the power monitor using any combination of one or more capacitors and/or inductors in combination with one or more resistors. For example, reactor 230 can include a capacitor arranged in a series or parallel arrangement with one or more resistors 235, depending on the design and application. For instance, reactor 230 can include an inductor arranged in a series or a parallel arrangement with one or more resistors 235, depending on the design and application.

In the examples in which the reactor 230 is an inductor (e.g., an LC filter circuit), the inductor can introduce inductive reactance, which can impede the flow of high-frequency signals more than low-frequency signals. By selectively amplifying the higher-frequency components of the sensor measurement 125, the gain stage circuit 240 can effectively extend the bandwidth of the sensor 105. This can allow or result in faster response times to high-frequency variations in the input signal to the circuit 200, than would have been the case without the gain stage circuit 240.

The combination of resistors 235 and reactors 230 in the gain stage circuit 240 can affect the time constants of the system 200, affecting the speed at which the system 200 can respond to changes in the input signal (e.g., sensor voltage 205 triggered by the optical output 155 of the laser 150). By fine tuning, adjusting, configuring or otherwise optimizing the values of the resistors 235 and reactors 230, the time constants can be adjusted to establish, set, adjust or otherwise improve the response time with respect to high-frequency ranges or variations (e.g., frequency window of interest). For example, a frequency window of interest can be frequency range including an expected range of rates of operation of the system 200 for detecting the mode hop events, which can correspond to the data rates of the write operations of the HDD. The gain stage circuit 240 can help maintain signal integrity by minimizing the distortion and attenuation of high-frequency components, which can allow the system 200 to accurately, expediently and effectively capture and amplify the fast-changing signals from the sensor 105 within time responses that a sensor 105 and its amplifier 215 would not been able to accomplish alone.

Figure 3:
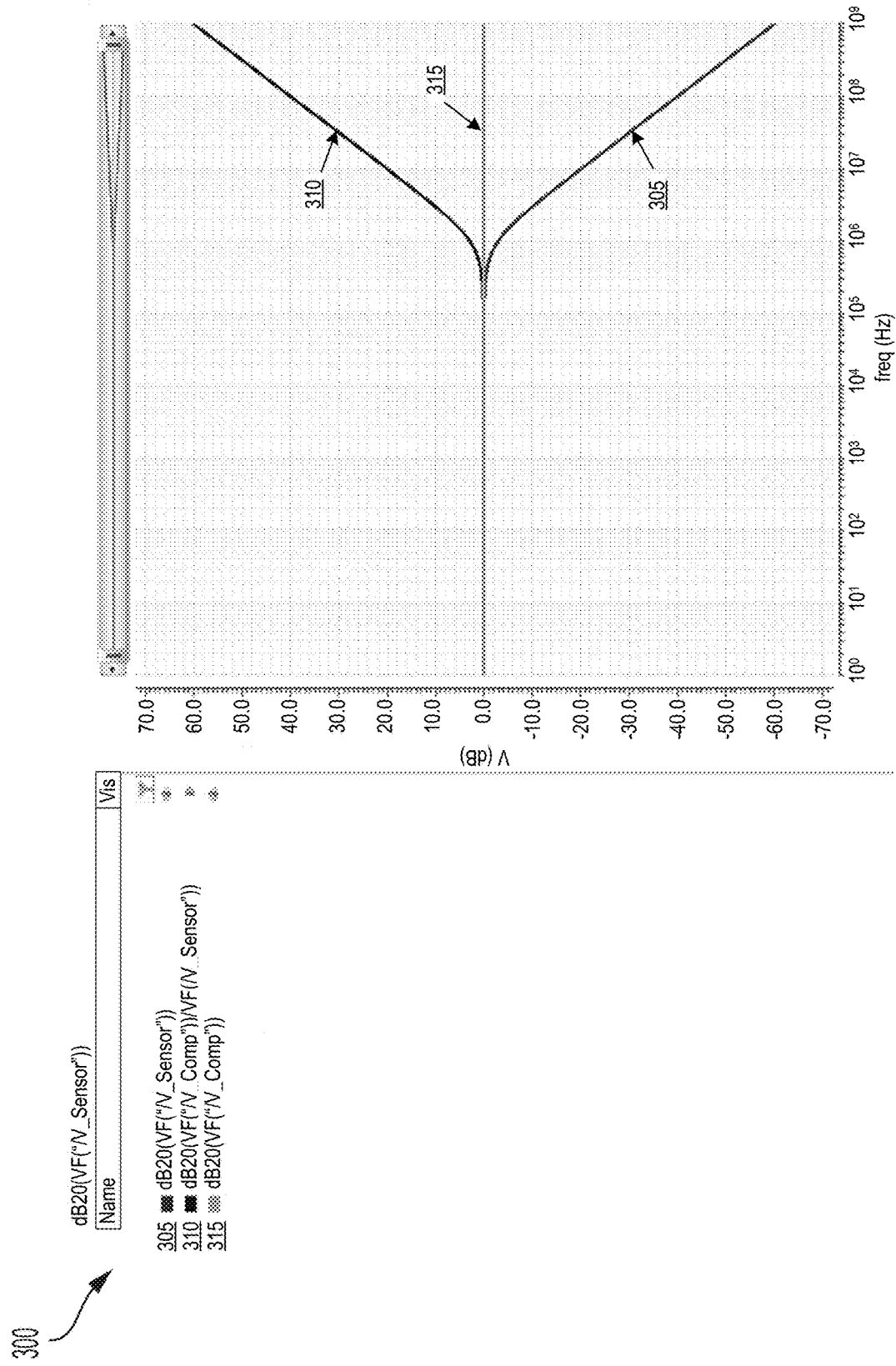
FIG. 3 is an example waveform of an operation or results of a mode hop detection system, in accordance with an aspect of the present technical solutions.

FIG. 3 illustrates a plot 300 corresponding to a frequency response of the system 200 circuitry. As shown in plot 300, waveform 305 represents a frequency response (e.g., sensor measurement 125 or Vf output) of a sensor 105 signal in terms of V (dB) as a function of frequency (Hz). Plot 315 in graph 300 represents an adjusted sensor measurement 225 (e.g. V_Comp) signal in terms of V (dB) as a function of frequency. Waveform 310 represents the frequency response of the gain stage circuit 240 (e.g., V_Comp/V_sensor signal) in terms of V (dB) as a function of frequency. As shown in plot 300, sensor 105 can have a frequency pole at 1 MHz (e.g., waveform 305), along with a gain stage having a frequency zero at 1 MHz (e.g., waveform 310), and providing an overall flat response (e.g., waveform 315) of the output of the system 200 (e.g., adjusted sensor measurement 225).

Figure 4:
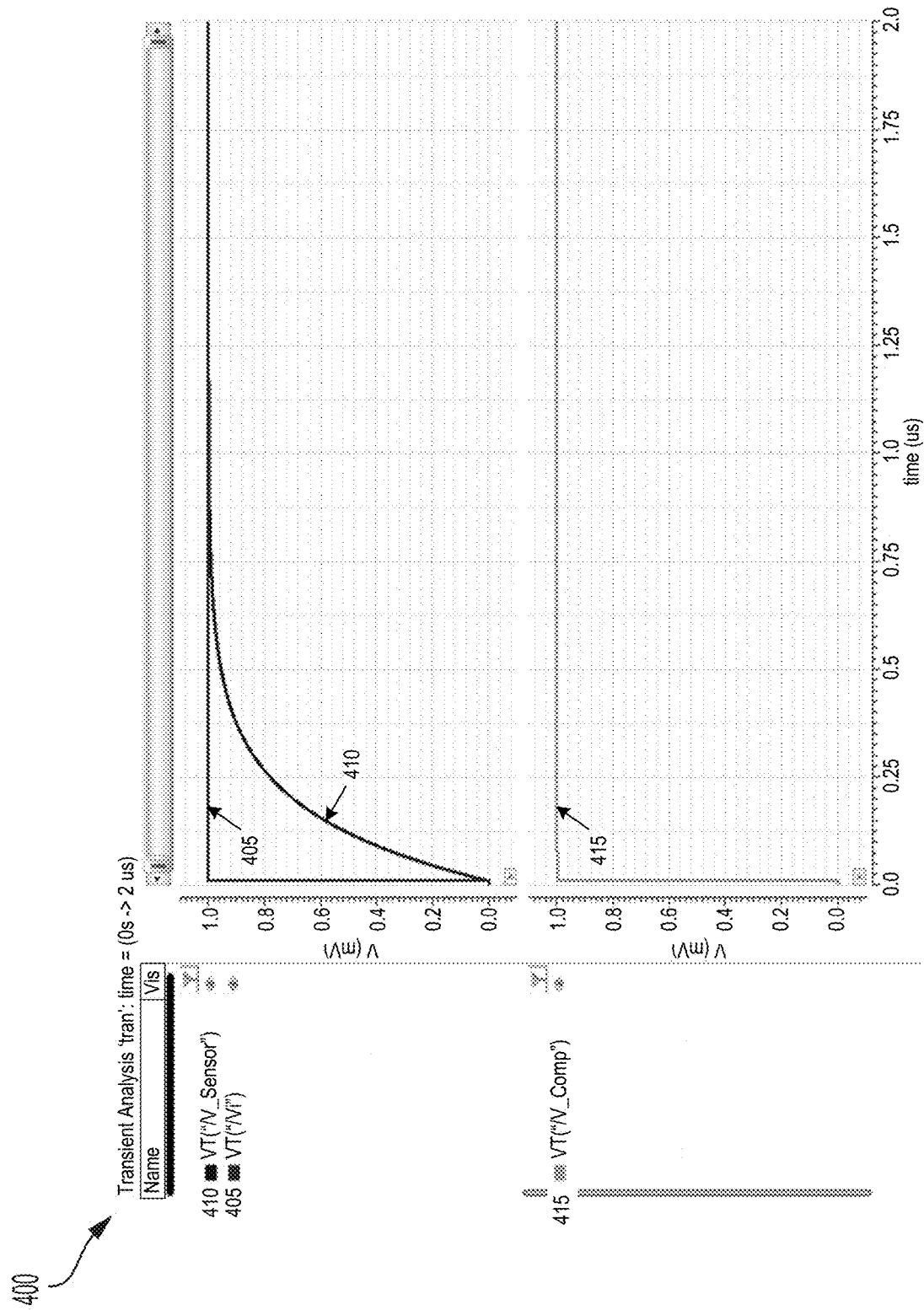
FIG. 4 is an example waveform of a mode hop event in a mode hop detection system, in accordance with an aspect of the present technical solutions.

FIG. 4 illustrates a plot 400 corresponding to a step response of the system 200 circuit. Plot 400 includes a top section with waveforms 405 and 410. Waveform 405 (e.g., Vi) shows a sensor voltage 205 at the input of the sensor 105 (e.g., corresponding to the light output 155 hitting the sensor 105). Waveform 405 shows that sensor voltage 205 (e.g., energy hitting the sensor) reacts instantly, as a step function, in response to a change in laser output behavior (e.g., mode hop event). Waveform 410 corresponds to a sensor measurement 125 (e.g., V_Sensor) curve which takes a time period or an interval (e.g., response time) to respond to the change in the optical output, reflected in graph 405. Waveform 410 therefore shows the sensor measurement 125 from the sensor 125 taking about 1 us to reach a steady state from 0V (at the start of the Vi signal) to 1V when the V_Sensor levels up with the Vi. For example, as graph 405 can represent a sensor voltage 205 or voltage input to sensor 105 making a 1 mV step within about 200 ps rise time occurring at 10 ns (e.g., representing a mode hop event at the laser 150), graph 410 (e.g., V_sensor) shown sensor 105 taking about 1 us to reach this steady state, in accordance with the frequency response of the sensor.

Meanwhile, the bottom graph in plot 400 shows an adjusted sensor measurement 225 (e.g., V_comp signal) also having a step function, similar to that of the sensor voltage 205 (e.g., Vi signal at 405). Waveform 415 shows adjusted sensor measurement 225 (e.g., V_comp) following the sensor voltage 205 (e.g., V_sensor) immediately (e.g., within a response time that is one or more orders of magnitude shorter than that of the sensor 105 alone at waveform 410). For example, waveform 415 shows the adjusted sensor measurement 225 adjusting after the Vi and reaching the steady state of the Vi within a response time of, for example, 0.5 ns, 1 ns, 2 ns, 5 ns, 10 ns, 15 ns, 25 ns, 30 ns, 50 ns. Accordingly, system 200 circuitry can improve the responsiveness (e.g., response time to detect the mode hop event) by up to 10, 50, 100, 500, 1000 or more than 1000 times faster than the sensor response time of 1 MHz, allowing the adjusted sensor measurement 225 (e.g., V_comp) to respond at, for example, 1 GHz, or within 1 ns.

Figure 5:
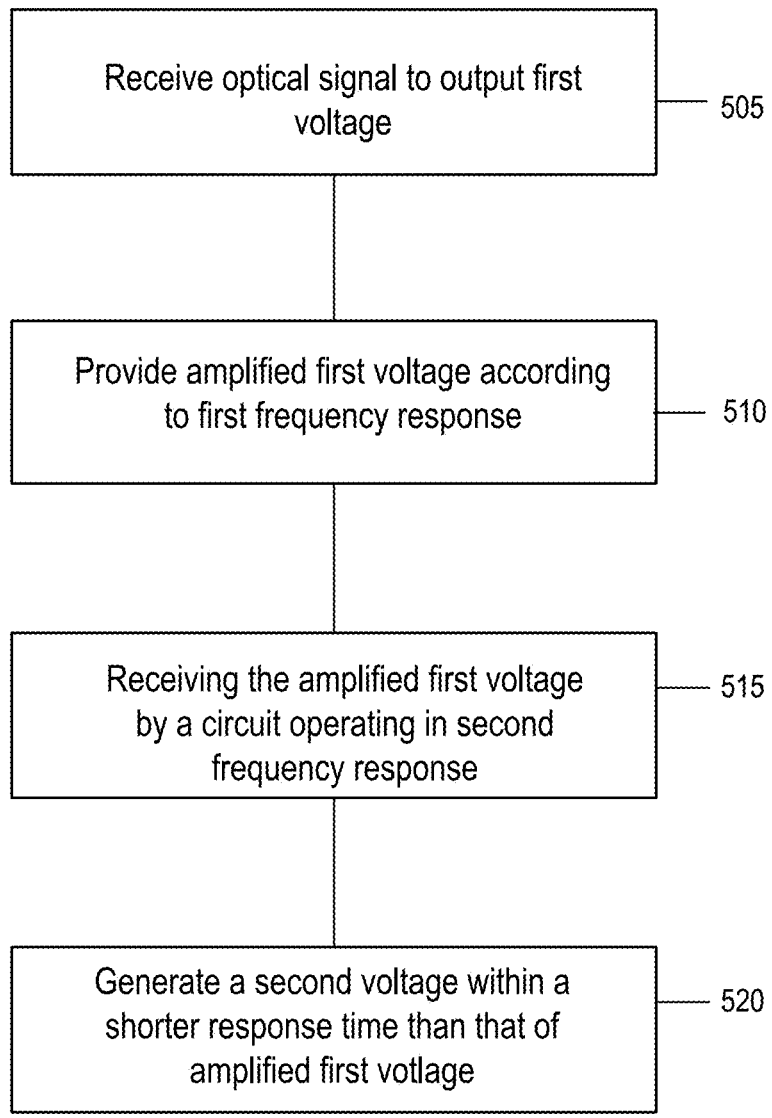
FIG. 5 illustrates an example flow diagram of a method for providing a mode hop detection, in accordance with an aspect of the present technical solutions.

FIG. 5 is an example flow diagram of a method 500 method for improving a response time for a mode hop detection and correction in a hard disk drive in accordance with the embodiments of the present solution. Method 500 can include acts 505 through 520 that can be implemented, for example, using any combination of features of example systems or circuits 100 and 200 described in connection with FIGS. 1-4. For example, at 505, the method can include receiving an optical signal to output a first voltage. At 510, the method can include providing amplified first voltage according to the first frequency response. At 515, the method can include receiving the amplified first voltage by a circuit operating in a second frequency response. At 520, the method can include generating a second voltage with a shorter response time than that of the amplified first voltage.

At 505, the method can include receiving an optical signal to output a first voltage. The method can include a sensor of a first circuit receiving as input an optical signal of a laser of a storage device and output a first voltage or a first signal that corresponds to, reflects on, or is indicative of, the optical signal. The sensor can include at least one of a bolometer or a photodetector, or any sensor or detector capable of detecting an optical signal of a laser or a laser diode. The first circuit can include a sensor along with any circuitry adjusting or processing the sensor measurement or output signal. The first circuit can include a sensor alone. The first circuit can include the sensor and an amplifier amplifying the sensor signal. The first circuit can include the sensor, a filter (e.g., low pass, high pass or band pass filter) filtering the sensor output and an amplifier processing filtered sensor output.

The optical output received by the sensor can indicate, reflect, or correspond to the mode hop event. The optical output can reflect the occurrence of the mode hop event at a time of occurrence of the mode hop event. An input signal into the sensor 105 can correspond to a sensor voltage that can follow or trail the timing of the change in optical output by a first time interval, such as an interval of 1 us or 2 us, corresponding to the frequency response of the sensor or the sensor and its processing circuitry (e.g., sensor coupled with amplifier and any filter circuits).

At 510, the method can include providing amplified first voltage according to the first frequency response. The method can include an amplifier of the first circuit amplifying the first voltage or the first signal to produce an amplified first voltage or an amplified first signal. The amplified first voltage can be indicative of a mode hop event, such as the mode hop event reflected in the optical output at 505. The amplified first voltage can trail the optical signal by a first response time of a first frequency response of the first circuit. The amplifier can include a differential amplifier, an operational amplifier circuit, a transistor-based amplification circuit. The amplifier can amplify or provide gain to the first voltage or signal by any amount, such as a factor of 2, 4, 10, 15, 20, 30, 50, 100, 200 or more than 200 times the original input signal (e.g., first voltage).

The first circuit can be configured (e.g., based on its reactance and/or resistance) to operate or provide its output (e.g., first voltage or the amplified first voltage) according to the first frequency response of the first circuit. The first frequency response can be defined by at least an intrinsic resistance and an intrinsic capacitance of the sensor. For instance, the first frequency response can be defined, correspond to, or be set based on the intrinsic capacitance, inductance and/or resistance of the sensor, any filters or other circuitry of the sensor and/or amplifier.

The method can include the amplified first voltage indicating the mode hop event within the first response time from the time of occurrence. The first time response can correspond to a time interval or a duration between the occurrence of the mode hop event until the first voltage and/or the amplified first voltage indicates the mode hop event. For instance, the first time interval can correspond to a time it takes the signal (e.g., first voltage or amplified first voltage) to be increased from an initial value to an increased or a final value that corresponds to a mode hop event, a read to write operation transition event or any other event indicative by the optical output of the laser. The first time interval can be an interval of anywhere between 0.5 us to 5 us, such as 1 us or 2 us, corresponding to a bolometer or photo detector response time (e.g., at 1 MHz or 0.5 MHz).

At 515, the method can include receiving the amplified first voltage by a circuit operating in a second frequency response. The method can include a second circuit coupled in series with the first circuit receiving the amplified first voltage. The second circuit can operate according to a second frequency response. The second frequency response can be equal to an inverse of the first frequency response. The second frequency response can be equal to or match the first frequency response. The second frequency response can be equal to or match a negative version of the frequency response. The second frequency response can be equal to or match a negative inverse of the frequency response. The amplified first voltage can be received from an output of the amplifier amplifying the sensor measurement signal.

The second circuit can include a gain stage circuit that can be configured, based on its reactance and/or resistance, to operate in accordance with a second frequency response. The second circuit can include one or more inductors arranged in series or in parallel with one or more resistors to define, set, provide or establish the second frequency response of the second circuit. The second circuit can include one or more capacitors arranged in series or in parallel with one or more resistors to define, set, provide or establish the second frequency response of the second circuit. The second circuit can include one or more inductors arranged in series or in parallel with one or more capacitors and/or resistors to define, set, provide or establish the second frequency response of the second circuit. The second circuit can be arranged in series with the first circuit (e.g., sensor and the amplifier). The second circuit can receive an output from an amplifier that amplifies the input signal.

The second frequency response of the second circuit can correspond to the first frequency response of the first circuit. The second frequency response can match or align with the first frequency response. The second frequency response can be an inverse of the first frequency response. For example, the second frequency response can be a negative inverse of the first frequency response. For example, the second frequency response can provide a mirror image value of any value corresponding to the first frequency response across a frequency axis of a plot in which the frequency axis is a horizontal axis (e.g., X-axis) and a V (dB) axis is vertical axis (e.g., a Y-axis).

At 520, the method can include generating a second voltage with a shorter response time than that of the amplified first voltage. The method can include the first circuit and the second circuit generating a second voltage indicative of the mode hop event based at least one the amplified first voltage adjusted by the second frequency response. The second voltage (e.g., adjusted sensor measurement) can be generated or produced based on a combined first frequency response and the second frequency response. The second voltage can be generated within a second response time that is shorter than the first response time.

The second frequency response can be defined, established or provided by at least a resistance of a resistor (e.g., one or more resistors) of the second circuit and an inductance of an inductor (e.g., one or more inductors) of the second circuit. The resistor (e.g., one or more resistors) and the inductor (e.g., one or more inductors) can be coupled in a series arrangement, a parallel arrangement or any combination of series and parallel arrangements.

The second frequency response can be defined, established or provided by at least a resistance of a resistor (e.g., on or more resistors) of the second circuit and a capacitance of a capacitor (e.g., one or more capacitors) of the second circuit. The resistor (e.g., one or more resistors) and the capacitor (e.g., one or more capacitors) can be coupled in a parallel arrangement, a series arrangement or any combination of series and parallel arrangements. The second response time can be defined, produced, provided or generated by, or based on, the second frequency response. The second response time can correspond to, or include a time duration of between 1 ns and 0.5 us, such as a time duration of up to 1 ns, 5 ns, 10 ns, 15 ns, 20 ns, 40 ns, 50 ns, 75 ns, 100 ns or 500 ns.

The method can include the second voltage indicating the mode hop event within the second response time from the time of occurrence. For example, the adjusted sensor measurement can include an increase from a lower voltage (e.g., 0.5 mV) to a higher voltage (e.g., 100 mV) within a second response time (e.g., 1 ns, 10 ns or 100 ns) which is less than the first response time of the amplified voltage signal (e.g., 0.9 us, 1.0 us, 1.5 us or 2 us). The second response time can correspond to a time duration with respect to the time of occurrence of the mode hop event that is at least ten times shorter than a time duration of the first response time with respect to the time of occurrence of the mode hop event. For example, the first response time of an amplified sensor measurement can have a duration of 1 us, whereas the second response time of the adjusted sensor measurement can have a duration of 5 ns (e.g., second response time is at least 10 times shorter than the first response time).

The first response function can correspond to an output of the first circuit decreasing in decibels at a first rate as a frequency increases, while the second response function corresponds to an output of the second circuit increasing in decibels at the first rate as the frequency increases. The second voltage can be formed based on the combination of the first circuit and the second circuit, and their corresponding frequency responses, and remain at zero decibels as the frequency increases.

The second voltage can be input into a driver circuit for the laser and be used for adjusting the optical signal of the laser. For instance, an adjusted sensor measurement can be input into a driver circuit to adjust bias current input to the laser, and thereby adjust optical power of the laser. The second voltage can be input into a peak detector and used for determining that a mode hop event has occurred responsive to an increase in the second voltage. For example, the adjusted sensor measurement can be input into a filter (e.g., band pass filter) and then into a peak detector to be matched against a threshold of the peak detector to determine, identify or detect a mode hop, by providing a mode hop detected signal.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., delay circuit, filter, peak detector) that can operate within a system or environment. It should be understood that the systems described above can provide multiple ones of any or each of those components and these components can be provided on either a standalone machine or, in some embodiments, on multiple machines in a distributed system. Further still, bit field positions can be changed, and multibit words can be used. In addition, the systems and methods described above can be provided as one or more computer-readable programs or executable instructions embodied on or in one or more articles of manufacture, e.g., a hard disk, a CD-ROM, a flash memory card, a PROM, a RAM, a ROM, or a magnetic tape. At least portions of the technical solutions can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A circuitry comprising:
    a sensor of a first circuit configured to receive as input an optical signal of a laser of a storage device and output a first voltage indicative of the optical signal;
    an amplifier of the first circuit configured to amplify the first voltage to produce an amplified first voltage indicative of a mode hop event, the amplified first voltage trailing the optical signal by a first response time of a first frequency response of the first circuit;
    a second circuit coupled in series with the first circuit and configured to receive the amplified first voltage, the second circuit operating according to a second frequency response that is an inverse of the first frequency response; and
    wherein the circuitry is configured to generate, based at least on the amplified first voltage adjusted by the second frequency response, a second voltage indicative of the mode hop event, the second voltage generated within a second response time that is shorter than the first response time.

2. The circuitry of claim 1, wherein the first frequency response is defined by at least a resistance and a capacitance of the sensor.

3. The circuitry of claim 1, where in the sensor is at least one of a bolometer or a photodetector and the second response time corresponds to a time duration of between 1 ns and 5 us.

4. The circuitry of claim 1, wherein the second frequency response is defined by at least a resistance of a resistor of the second circuit and an inductance of an inductor of the second circuit, the resistor and the inductor coupled in a series arrangement.

5. The circuitry of claim 1, wherein the second frequency response is defined using a metal-oxide-semiconductor field-effect transistor (MOSFET) in a common-gate configuration in which a gate terminal of the MOSFET is connected to a ground via a resistive element.

6. The circuitry of claim 1, wherein the optical output is indicative of the mode hop event at a time of occurrence of the mode hop event, the amplified first voltage is indicative of the mode hop event within the first response time from the time of occurrence, and the second voltage is indicative of the mode hop event within the second response time from the time of occurrence.

7. The circuitry of claim 6, wherein the second response time corresponds to a time duration with respect to the time of occurrence of the mode hop event that is at least ten times shorter than a time duration of the first response time with respect to the time of occurrence of the mode hop event.

8. The circuitry of claim 1, wherein the first response function corresponds to an output of the first circuit decreasing in decibels at a first rate as a frequency increases, wherein the second response function corresponds to an output of the second circuit increasing in decibels at the first rate as the frequency increases, and wherein the second voltage remains at zero decibels as the frequency increases.

9. The circuitry of claim 1, wherein the second voltage is input into a driver circuit for the laser to adjust the optical signal of the laser.

10. The circuitry of claim 1, wherein the second voltage is input into a peak detector to determine that a mode hop event has occurred responsive to an increase in the second voltage.

11. A method comprising:
    receiving, by a sensor of a first circuit, as input an optical signal of a laser of a storage device and output a first voltage indicative of the optical signal;
    amplifying, by an amplifier of the first circuit, the first voltage to produce an amplified first voltage indicative of a mode hop event, the amplified first voltage trailing the optical signal by a first response time of a first frequency response of the first circuit;
    receiving, by a second circuit coupled in series with the first circuit, the amplified first voltage, the second circuit operating according to a second frequency response that is an inverse of the first frequency response; and
    generating, by the first circuit and the second circuit, based at least on the amplified first voltage adjusted by the second frequency response, a second voltage indicative of the mode hop event, the second voltage generated within a second response time that is shorter than the first response time.

12. The method of claim 11, wherein the first frequency response is defined by at least an electrical time constant of the sensor.

13. The method of claim 11, where in the sensor is at least one of a bolometer or a photodetector and the second response time corresponds to a time duration of between 1 ns and 5 us.

14. The method of claim 11, wherein the second frequency response is defined by at least a resistance of a resistor of the second circuit and an inductance of an inductor of the second circuit, the resistor and the inductor coupled in a series arrangement.

15. The method of claim 11, wherein the second frequency response is defined using a metal-oxide-semiconductor field-effect transistor (MOSFET) in a common-gate configuration in which a gate terminal of the MOSFET is connected to a ground via a resistive element.

16. The method of claim 11, comprising:
indicating, by the optical output, the mode hop event at a time of occurrence of the mode hop event;
indicating, by the amplified first voltage, the mode hop event within the first response time from the time of occurrence; and
indicating, by the second voltage, the mode hop event within the second response time from the time of occurrence, wherein the second response time corresponds to a time duration with respect to the time of occurrence of the mode hop event that is at least ten times shorter than a time duration of the first response time with respect to the time of occurrence of the mode hop event.

17. The method of claim 11, wherein the first response function corresponds to an output of the first circuit decreasing in decibels at a first rate as a frequency increases, wherein the second response function corresponds to an output of the second circuit increasing in decibels at the first rate as the frequency increases, and wherein the second voltage remains at zero decibels as the frequency increases.

18. The method of claim 11, comprising:
adjusting, by the second voltage input into a driver circuit for the laser, the optical signal of the laser.

19. The method of claim 11, comprising:
determining, by the second voltage input into a peak detector, that a mode hop event has occurred responsive to an increase in the second voltage.

20. A hard disk drive system, comprising:
a sensor of a first circuit configured to receive as input an optical signal of a laser of a storage device and output a first voltage indicative of the optical signal;
an amplifier of the first circuit configured to amplify the first voltage to produce an amplified first voltage indicative of a mode hop event, the amplified first voltage trailing the optical signal by a first response time of a first frequency response of the first circuit;
a second circuit coupled in series with the first circuit and configured to receive the amplified first voltage, the second circuit operating according to a second frequency response that is an inverse of the first frequency response; and
wherein the first circuit and the second circuit are configured to generate, based at least one the amplified first voltage adjusted by the second frequency response, a second voltage indicative of the mode hop event, the second voltage generated within a second response time that is shorter than the first response time.

* * * * *